United States Patent
Yang et al.

(10) Patent No.: US 11,444,675 B2
(45) Date of Patent: Sep. 13, 2022

(54) BEAM FAILURE RECOVERY REQUEST TRANSMISSION METHOD, RECEPTION METHOD, DEVICES AND SYSTEM

(71) Applicant: VIVO MOBILE COMMUNICATION CO., LTD., Guangdong (CN)

(72) Inventors: Yu Yang, Guangdong (CN); Peng Sun, Guangdong (CN); Jingzhi Ma, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 133 days.

(21) Appl. No.: 16/760,116

(22) PCT Filed: Oct. 10, 2018

(86) PCT No.: PCT/CN2018/109703
§ 371 (c)(1),
(2) Date: Apr. 29, 2020

(87) PCT Pub. No.: WO2019/095896
PCT Pub. Date: May 23, 2019

(65) Prior Publication Data
US 2020/0259546 A1    Aug. 13, 2020

(30) Foreign Application Priority Data
Nov. 17, 2017   (CN) .......................... 201711148199.2

(51) Int. Cl.
*H04B 7/06* (2006.01)
*H04W 16/28* (2009.01)
(Continued)

(52) U.S. Cl.
CPC ......... *H04B 7/0695* (2013.01); *H04B 7/0626* (2013.01); *H04W 16/28* (2013.01);
(Continued)

(58) Field of Classification Search
CPC ... H04B 7/0695; H04B 7/0626; H04W 16/28; H04W 24/08; H04W 72/0413; H04W 72/042; H04W 74/0833
See application file for complete search history.

(56) References Cited

FOREIGN PATENT DOCUMENTS

| CA | 3016574 A1 | 10/2017 |
|---|---|---|
| WO | 2017180336 A1 | 10/2017 |

OTHER PUBLICATIONS

3GPP TSG RAN WG2 #99 R2-1708677 (Year: 2017).*
(Continued)

*Primary Examiner* — Ricky Q Ngo
*Assistant Examiner* — Stephen N Steiner
(74) *Attorney, Agent, or Firm* — Brooks Kushman P.C.

(57) ABSTRACT

A beam failure recovery request transmission method, reception method, devices, and systems relating to a communication technology field are provided to solve a problem that UE cannot transmit a beam failure recovery request to a base station when UE detects failure of only parts of PDCCH beams, resulting that beam failure cannot be recovered in time. The transmission method performed by UE includes: detecting whether each of all PDCCH beams fails, the all PDCCH beams being configured by base station for UE to monitor; if UE determines that the quantity of failed PDCCH beams is within a preset range greater than 0 and less than a total quantity of all PDCCH beams, transmitting a first beam failure recovery request to base station; if UE determines failure of all PDCCH beams, transmitting a second beam failure recovery request different from the first beam failure recovery request to base station.

18 Claims, 3 Drawing Sheets

(51) Int. Cl.
  *H04W 24/08* (2009.01)
  *H04W 72/04* (2009.01)
  *H04W 74/08* (2009.01)

(52) U.S. Cl.
  CPC ......... *H04W 24/08* (2013.01); *H04W 72/042* (2013.01); *H04W 72/0413* (2013.01); *H04W 74/0833* (2013.01)

(56) References Cited

OTHER PUBLICATIONS

3GPP TSG RAN WG1 Meeting 90bis R1-1718389 (Year: 2017).*
3GPP TSG RAN WG1 Meeting 90bis, R1-1717606, Prague, Czech Oct. 9-13, 2017, 7 pages.
3GPP TSG-RAN WG2 #99-bis R2-1710881, Prague, Czech, Oct. 9-13, 2017, 6 pages.
3GPP TSG-RAN WG2 Meeting #99 R2-1711770, Berlin, Germany, Aug. 21-25, 2017, 4 pages.
3GPP TSG AN WG1 Meeting #90-bis R1-1717425, Prague, Czechia, Oct. 9-13, 2017, 8 pages.
3GPP TSG-RAN WG2 #99 R2-1708677, Berlin, Germany, Aug. 21-25, 2017, 3 pages.
Extended European Search Report dated Dec. 9, 2020 issued in PCT/CN2018/109703.
3GPP TSG RAN WG1 Meeting #88bis, R1-1704478, Spokane, USA, Apr. 3-7, 2017, "Discussion on Beam Failure Recovery Procedure", 3 pages.
3GPP TSG RAN WG1 Meeting #90bis, R1-1718010, Prague, Czech Republic, Oct. 9-13, 2017, "Discussions on Beam Failure Recovery", 3 pages.
3GPP TSG RAN WG1 Meeting 90bis, R1-1718389, Prague, Czech Republic, Oct. 9-13, 2017, "Beam Recovery for Full and Partial Control Channel Failure", 6 pages.

* cited by examiner

BEAM FAILURE RECOVERY REQUEST TRANSMISSION METHOD, RECEPTION METHOD, DEVICES AND SYSTEM

CROSS-REFERENCE TO RELATED APPLICATION

"The present application is a U.S. national phase application of a PCT Application No. PCT/CN2018/109703 filed on Oct. 10, 2018, which claims a priority to the Chinese patent application No.201711148199.2 filed with SIPO on Nov. 17, 2017 and entitled "beam failure recovery request transmission method, reception method, devices and system", a disclosure of which is incorporated herein by reference in its entirety."

TECHNICAL FIELD

The present application relates to the field of communication technology, in particular to a beam failure recovery request transmission method, a beam failure recovery request reception method, devices, and a system.

BACKGROUND

In a high-frequency band communication system, due to a relatively short wavelength of a radio signal, the communication is easily interrupted in the case that the signal is blocked, user equipment (UE) moves, etc.

In the high-frequency band communication system, in the case of the communication interruption, the communication is recovered through a conventional time-consuming radio link reestablishment process, so a beam failure recovery mechanism has been introduced. Generally, the beam failure recovery mechanism includes four steps, i.e., beam failure detection, candidate beam identification, the transmission of a beam recovery request and the reception of a beam recovery response. Generally, a beam failure recovery process using the beam failure recovery mechanism includes: detecting, by the UE, all physical downlink control channel (PDCCH) beams; if the UE detects the failure of all the PDCCH beams, determining, by the UE, that a beam failure event occurs, and transmitting, by the UE, the beam failure recovery request to a base station; upon the receipt of the beam failure recovery request from the UE, transmitting, by the base station, a response signaling to the UE; and upon the receipt of the response instruction from the base station, performing, by the UE, the beam failure recovery according to the response instruction. However, in the conventional beam failure recovery mechanism, the UE determines that the beam failure event occurs only when the UE detects that all the PDCCH beams fail, and then transmits the beam failure recovery request to the base station. When the UE detects that only parts of the PDCCH beams fail, the UE will not determine that the beam failure event occurs, so the UE may not transmit the beam failure recovery request to the base station. Hence, in the case of the failure of parts of the PDCCH beams, the beam failure recovery cannot be performed in time.

SUMMARY

The present disclosure provides in some embodiments a beam failure recovery request transmission method, a beam failure recovery request reception method, devices, and a system, so as to solve the problem that the UE cannot transmit the beam failure recovery request to the base station when only parts of the PDCCH beams fail and thereby the beam failure recovery cannot be performed in time.

In one aspect, the present disclosure provides in some embodiments a beam failure recovery request transmission method, including: detecting, by UE, whether each PDCCH beam of all PDCCH beams fails, where the all PDCCH beams are PDCCH beams configured by a base station for UE to monitor; if the UE determines that a quantity of PDCCH beams that fail is within a preset range, transmitting, by the UE, a first beam failure recovery request to the base station, where the preset range is greater than 0 and less than a total quantity of the all PDCCH beams; if the UE determines that the all PDCCH beams fail, transmitting, by the UE, a second beam failure recovery request to the base station. The second beam failure recovery request is different from the first beam failure recovery request.

In another aspect, the present disclosure provides in some embodiments a beam failure recovery request reception method, including: receiving, by a base station, a report message from UE; and determining, by the base station, a message type of the report message in accordance with the report message. The message type includes a first beam failure recovery request transmitted by the UE to the base station when a quantity of PDCCH beams that fail is within a preset range and a second beam failure recovery request transmitted by the UE to the base station when all PDCCH beams fail. The preset range is greater than 0 and less than a total quantity of the all PDCCH beams, and the first beam failure recovery request is different from the second beam failure recovery request.

In yet another aspect, the present disclosure provides in some embodiments UE, including: a detection unit configured to detect whether each PDCCH beam of all PDCCH beams fails, the all PDCCH beams are PDCCH beams configured by a base station for the UE to monitor; and a transmission unit configured to, when the detection unit determines that a quantity of the PDCCH beams that fail is within a preset range, transmit a first beam failure recovery request to the base station, where the preset range is greater than 0 and less than a total quantity of the PDCCH beams, and when the detection unit determines that the all PDCCH beams fail, transmit a second beam failure recovery request to the base station. The second beam failure recovery request is different from the first beam failure recovery request.

In still another aspect, the present disclosure provides in some embodiments a base station, including: a reception unit configured to receive a report message from UE; and a processing unit configured to determine a message type of the report message in accordance with the report message. The message type includes a first beam failure recovery request transmitted by the UE to the base station when a quantity of PDCCH beams that fail is within a preset range and a second beam failure recovery request transmitted by the UE to the base station when all PDCCH beams fail. The preset range is greater than 0 and less than a total quantity of the PDCCH beams.

In still yet another aspect, the present disclosure provides in some embodiments UE, including a processor, a storage, and a computer program stored in the storage and configured to be executed by the processor. The processor is configured to execute the computer program to implement steps of the above-mentioned beam failure recovery request transmission method.

In still yet another aspect, the present disclosure provides in some embodiments a base station, including a processor, a storage, and a computer program stored in the storage and configured to be executed by the processor. The processor is configured to execute the computer program to implement steps of the above-mentioned beam failure recovery request reception method.

In still yet another aspect, the present disclosure provides in some embodiments a computer-readable storage medium storing therein a computer program. The computer program is configured to be executed by a processor to implement steps of the above-mentioned beam failure recovery request transmission method or steps of the above-mentioned beam failure recovery request reception method.

In still yet another aspect, the present disclosure provides in some embodiments a beam failure recovery request transmission system, including the above-mentioned UE and the above-mentioned base station.

According to the beam failure recovery request transmission method in the embodiments of the present disclosure, the UE may at first detect whether each of all PDCCH beams fails, transmit the first beam failure recovery request to the base station if the UE determines that the quantity of the PDCCH beams that fail is within the preset range, and transmit the second beam failure recovery request to the base station if the UE determines that all PDCCH beams fail. The preset range is greater than 0 and less than the total quantity of all PDCCH beams, so the quantity of the PDCCH beams that fail falling within the preset range means that some of the all PDCCH beams fail. In addition, the first beam failure recovery request transmitted by the UE to the base station when the quantity of the PDCCH beams that fail is within the preset range is different from the second beam failure recovery request transmitted by the UE to the base station when all the PDCCH beams fail, so the base station may learn from the beam failure recovery request that the quantity of the PDCCH beams that fail is within the preset range, and then perform the beam failure recovery. As a result, the beam failure recovery may be performed in time when parts of all PDCCH beams fail.

DETAILED DESCRIPTION

The technical solutions in embodiments of the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain other embodiments, which also fall within the scope of the present disclosure.

The technical solutions in embodiments of the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain other embodiments, which also fall within the scope of the present disclosure.

The expression "and/or" is merely used to describe a relationship between objects, and it includes three relationships. For example, "A and/or B" may denote the following three cases: there is only A, there are both A and B, and there is only B.

In addition, such words as "first" and "second" in the description and claims of the present disclosure are merely be adopted to differentiate between different objects rather than to indicate any specific order of the objects. For example, a first demonstrative operation and a second demonstrative operation are used to differentiate between different demonstrative operations, rather than to indicate a specific order of the demonstrative operations.

Such expressions as "illustrative" and "for example" are merely used to show that examples or explanations are made. Any embodiment or scheme described with "illustrative" and "for example" in the present disclosure shall not be construed as being more preferable or advantageous than the other embodiment or scheme. In specific, these words are intended to present relevant concepts in a concrete manner. In addition, in the description of the present disclosure, unless otherwise defined, the expression "a plurality of" refers to two or more.

In a conventional beam failure recovery mechanism, only when UE detects that all PDCCH beams fail, the UE determines that a beam failure event occurs and then transmits a beam failure recovery request to a base station. When only parts of the PDCCH beams fail, the UE will not determine that the beam failure event occurs, so the UE cannot transmit the beam failure recovery request to the base station. Hence, in the case that parts of the PDCCH beams fail, the beam failure recovery cannot be performed in time.

In order to solve the above problem, the present disclosure provides a beam failure recovery request transmission method, a beam failure recovery request reception method, devices, and a system. In the beam failure recovery request transmission method, the UE may at first detect whether each of all PDCCH beams fails, transmit the first beam failure recovery request to the base station when the UE determines that the quantity of the PDCCH beams that fail is within the preset range, and transmit the second beam failure recovery request to the base station when the UE determines that all PDCCH beams fail. The preset range is greater than 0 and less than the total quantity of the PDCCH beams, so the quantity of the PDCCH beams that fail falling within the preset range means that parts of the PDCCH beams fail. In addition, the first beam failure recovery request transmitted by the UE to the base station when the quantity of the PDCCH beams that fail is within the preset range is different from the second beam failure recovery request transmitted by the UE to the base station when all PDCCH beams fail, so the base station may learn from the beam failure recovery request that the quantity of the PDCCH beams that fail is within the preset range, and then perform the beam failure recovery. As a result, according to embodiments of the present disclosure, the beam failure recovery may be performed in time when parts of all PDCCH beams fail.

Figure 1:
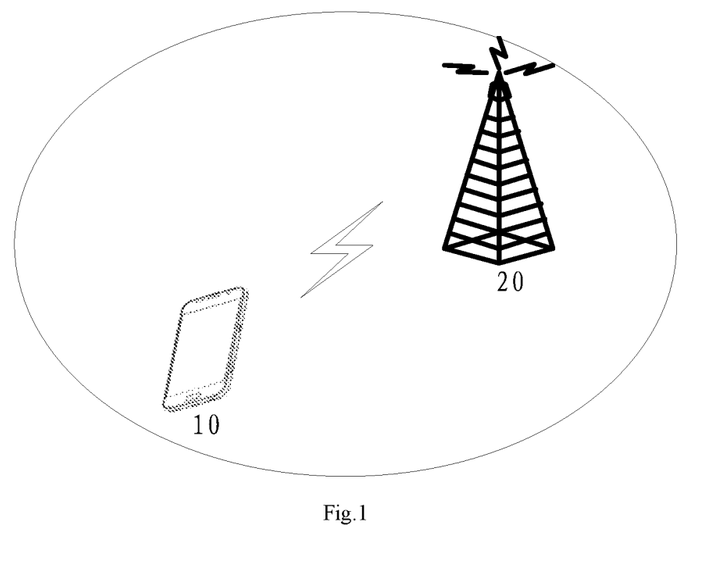
FIG. 1 is a schematic view showing architecture of a beam failure recovery request transmission system according to some embodiments of the present disclosure.

As shown in FIG. 1, in one application scenario of some embodiments of the present disclosure, a beam failure recovery request transmission system may include UE 10 and a base station 20. The UE 10 is connected to the base station 20 via a radio communication link established between the UE 10 and the base station 20.

The UE 10 may be referred to as terminal, mobile station, subscriber unit, station or the like. The UE 10 may be a cellular phone, personal digital assistant (PDA), modem, wireless communication device, handheld device, laptop computer, cordless phone, wireless local loop (WLL) station or the like. When the UE is applied to Machine-to-Machine (M2M) communication, the UE may also be referred to as M2M terminal, such as smart electricity meter or smart home appliances that supports the M2M communication. The UE may also be a tablet, smart vehicle, sensor, Internet of things (IOT) device, customer-premises equipment (CPE), relay station, relay terminal, or a computer equipped with the UE. The UE may also be a portable, pocket-sized, handheld, built-in or vehicle-mounted mobile device, which is capable of exchanging voice and/or data with a radio access network (RAN). For example, the UE may be a mobile phone, personal communication service (PCS) telephone, cordless phone, session initiation protocol (SIP) phone, or WLL station. The wireless terminal may also be referred to as user agent, user device or user equipment (UE). For example, in some embodiments of the present disclosure, the UE 10 is a mobile phone as shown in FIG. 1.

The base station 20 may be any one of or a combination of: a gNB, New Radio evolved Node B (NR eNB), transmission and reception point (TRP), macro base station, micro base station, high-frequency base station, Long Term Evolution (LTE) macro or micro eNB, CPE, wireless local area network (WLAN) access point (AP), and WLAN group owner (GO), or the like.

First Embodiment

Figure 2:
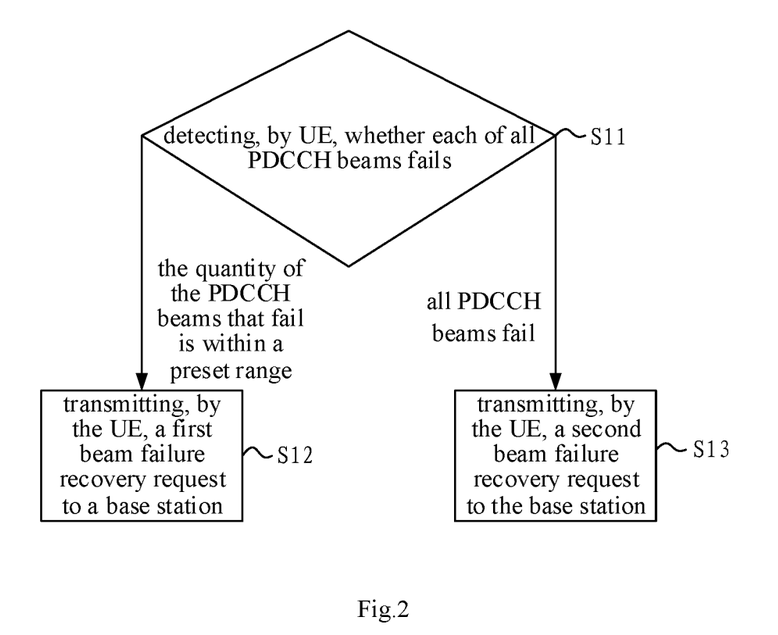
FIG. 2 is a flow chart of a beam failure recovery request transmission method according to some embodiments of the present disclosure.

As shown in FIG. 2, the present disclosure provides in some embodiments a beam failure recovery request transmission method, which may include the following steps S11 to S13.

S11: detecting, by UE, whether each of all PDCCH beams fails. The all PDCCH beams are PDCCH beams configured by a base station for the UE to monitor, i.e., the UE may detect all PDCCH beams configured by the base station for UE to monitor, and determine whether each PDCCH beam fails.

Optionally, the detection as to whether each of all PDCCH beams fails in the S11 may be implemented through the following process.

S111: measuring, by the UE, a reference signal of a PDCCH beam to acquire link quality of the PDCCH beam.

Optionally, the reference signal of the PDCCH beam may be a beam failure detection reference signal, or a reference signal for beam measurement in beam management, or a reference signal for channel state information (CSI) measurement.

That is, the UE may acquire the link quality of each PDCCH beam through measuring the beam failure detection reference signal on each PDCCH beam, or through measuring the reference signal for beam measurement on each PDCCH beam, or through measuring the reference signal for CSI measurement on each PDCCH beam.

Further, the UE may measure one or more of reference signal receiving power (RSRP), block error ratio (BLER), reference signal received quality (RSRQ) or received signal strength indication (RSSI) of a reference signal of each PDCCH beam, and characterize the link quality of each PDCCH beam by combining the one or more measurement results derived from the reference signal measurement.

S112: determining whether the link quality of a PDCCH beam is less than a quality threshold.

Optionally, the quality threshold may be configured by a network side device for the UE, and the network side device may be a base station.

In the S112, if the link quality of a PDCCH beam is less than the quality threshold, S113 is performed, and if the link quality of a PDCCH beam is greater than or equal to the quality threshold, S114 is performed.

S113: determining that the PDCCH beam fails.

S114: determining that the PDCCH beam does not fail.

Further, in the S11, if the UE determines that a quantity of PDCCH beams that fail is within a preset range, the following step S12 is performed, and if the UE determines that all PDCCH beams fail, the following step S13 is performed.

The preset range is greater than 0 and less than a total quantity of all PDCCH beams, i.e., it may be represented as (0, the total quantity of PDCCH beams). For example, assuming the total quantity of all PDCCH beams is 4, the preset range is (0, 4), and assuming the total quantity of all PDCCH beams is 8, the preset range is (0, 8).

To be specific, the UE may count the PDCCH beams that fail. When a count value is greater than 0 and less than the total quantity of all PDCCH beams, the UE may determine that the quantity of the PDCCH beams that fail is within the preset range. When the count value is equal to the total quantity of all PDCCH beams, the UE may determine that all the PDCCH beams fail.

S12: transmitting, by the UE, a first beam failure recovery request to the base station.

Information carried in the first beam failure recovery request is described hereinafter.

Optionally, the first beam failure recovery request transmitted by the UE to the base station may include at least one of: identifiers of one or more PDCCH beams that fail, quality information about the one or more PDCCH beams that fail, identifiers of one or more downlink beams whose qualities meet a preset condition, or quality information about the one or more downlink beams whose qualities meet the preset condition.

To be specific, the first beam failure recovery request transmitted by the UE to the base station may include only the identifiers of the one or more PDCCH beams that fail, or include only the identifiers of the one or more downlink beams whose qualities meet the preset condition, or include only the identifiers of the one or more PDCCH beams that fail and the identifiers of the one or more downlink beams whose qualities meet the preset condition, or include the identifiers of the one or more PDCCH beams that fail, the quality information about the one or more PDCCH beams that fail and the identifiers of the one or more downlink beams whose qualities meet the preset condition, or include the identifiers of the one or more PDCCH beams that fail, the identifiers of the one or more downlink beams whose qualities meet the preset condition and the quality information about the one or more downlink beams whose qualities meet the preset condition, or include the identifiers of the one or more PDCCH beams that fail, the quality information about the one or more PDCCH beams that fail, the identifiers of the one or more downlink beams whose qualities meet the preset condition, and the quality information about the one or more downlink beams whose qualities meet the preset condition.

Optionally, the quantity of the downlink beams whose qualities meet the preset condition included in the first beam failure recovery request may be configured by the base station for the UE.

To be specific, the base station may configure the quantity of the downlink beams whose qualities meet the preset condition included in the first beam failure recovery request by means of a radio resource control (RRC) signaling.

Optionally, the UE may determine the downlink beams whose qualities meet the preset condition through measuring the beam failure detection reference signal, the reference signal for beam measurement in beam management, or a reference signal for candidate beam identification.

Similarly, the UE may measure one or more of the RSRP, the BLER, the RSRQ or the RSSI of each PDCCH beam, and characterize the quality of each downlink beam by combining the one or more measurement results derived from the reference signal measurement.

It should be appreciated that, the downlink beams whose qualities meet the preset condition may be totally different from PDCCH beams originally configured for the UE, or parts of the downlink beams may be the same as the PDCCH beams originally configured for the UE. For example, assuming the PDCCH beams configured by the base station for the UE to monitor include a PDCCH beam A, a PDCCH beam B, a PDCCH beam C and a PDCCH beam D, the downlink beams whose qualities meet the preset condition may not include any one of the PDCCH beam A, the PDCCH beam B, the PDCCH beam C and the PDCCH beam D, or may include one, two or three of the PDCCH beam A, the PDCCH beam B, the PDCCH beam C and the PDCCH beam D.

Optionally, the first beam failure recovery request may further include indication information for indicating a message type of a report message. The indication information may be a signaling bit newly added in uplink control information (UCI), or an unused state of a signaling bit in the UCI. In other words, the first beam failure recovery request may further carry the indication information for indicating the message type of the first beam failure recovery request.

To be specific, the indication information may be one or more signaling bits newly added in the UCI. For example, one signaling bit is added at the end of the UCI, thereby representing the indication information in the first beam failure recovery request. Optionally, the indication information may be an unused state of a signaling bit in the UCI. For example, the UCI may include 10 signaling bits, thus the UCI has 1024 signaling bit states, and only 1020 signaling bit states of the UCI have been used. At this time, at least one of the unused 4 signaling bit states may be used to represent the indication information in the first beam failure recovery request.

Uplink resources used in the transmission of the first beam failure recovery request are described hereinafter.

In some embodiments of the present disclosure, at first, the uplink resources used in the transmission of the first beam failure recovery request may be configured by the base station through an RRC signaling, i.e., the network side device may configure the uplink resources used by the UE to transmit the first beam failure recovery request.

Optionally, the first beam failure recovery request is transmitted on a first uplink resource which is different from a designated uplink resource. The designated uplink resource includes uplink resources for transmitting a beam report and uplink resources for transmitting a CSI report.

In some embodiments of the present disclosure, the beam report may refer to a beam report transmitted by the UE to the base station during the beam measurement.

In other words, the uplink resources adopted by the UE for transmitting the first beam failure recovery request are different from the uplink resources used in transmitting the beam report during beam management, and different from the uplink resources used in transmitting the CSI report.

Because the uplink resources adopted by the UE for transmitting the first beam failure recovery request are different from the uplink resources used in transmitting the beam report during the beam management and different from the uplink resources used in transmitting the CSI report, upon the receipt of the report message, the base station may determine a type of a received report message in accordance with the uplink resource on which the report message is received.

Optionally, the UE transmits the first beam failure recovery request to the base station on at least one group of uplink resources selected from the uplink resources for transmitting the beam report and the uplink resources for transmitting the CSI report in accordance with a first preset rule. In other words, the uplink resources for transmitting the beam report and/or the uplink resources for transmitting the CSI report may be reused by the UE for transmitting the first beam failure recovery request.

Optionally, the first preset rule includes: selecting all uplink resources for transmitting the beam report and/or all uplink resources for transmitting the CSI report; or selecting closest available uplink resources from the uplink resources for transmitting the beam report and/or the uplink resources for transmitting the CSI report; or selecting uplink resources with a shortest period from the uplink resources for transmitting the beam report and/or the uplink resources for transmitting the CSI report; or selecting uplink resources whose signaling bit lengths are closest to a signaling bit length of the beam failure recovery request from the uplink resources for transmitting the beam report and/or the uplink resources for transmitting the CSI report; or selecting uplink resources whose indices meet a preset condition from the uplink resources for transmitting the beam report and/or the uplink resources for transmitting the CSI report.

To be specific, implementation modes of selecting the uplink resources in accordance with the preset rule for the transmission of the first beam failure recovery request to the base station will be described hereinafter in two circumstances.

In a first circumstance, the uplink resources for transmitting the beam report and the uplink resources for transmitting the CSI report include a plurality of groups of uplink resources, and the uplink resources for transmitting the beam report are different from the uplink resources for transmitting the CSI report. At this time, the uplink resources for transmitting the first beam failure recovery request may be selected from the uplink resources for transmitting the beam report and/or the uplink resources for transmitting the CSI report in accordance with the first preset rule. Hence, the following implementation modes may be provided.

In a first implementation mode, all uplink resources for transmitting the beam report are selected to transmit the first beam failure recovery request.

In a second implementation mode, all uplink resources for transmitting the CSI report are selected to transmit the first beam failure recovery request.

In a third implementation mode, all uplink resources for transmitting the beam port and all uplink resources for transmitting the CSI report are selected to transmit the first beam failure recovery request.

In a fourth implementation mode, the closest available uplink resources are selected from the uplink resources for transmitting the beam report to transmit the first beam failure recovery request. The closest available uplink resources may refer to uplink resources closest to a current time point among available uplink resources.

In a fifth implementation mode, the closest available uplink resources are selected from the uplink resources for transmitting the CSI report to transmit the first beam failure recovery request.

In a sixth implementation mode, the closest available uplink resources are selected from the uplink resources for transmitting the beam report and the uplink resources for transmitting the CSI report to transmit the first beam failure recovery request.

In a seventh implementation mode, the uplink resources with the shortest period are selected from the uplink resources for transmitting the beam report to transmit the first beam failure recovery request.

In an eighth implementation mode, the uplink resources with the shortest period are selected from the uplink resources for transmitting the CSI report to transmit the first beam failure recovery request.

In a ninth implementation mode, the uplink resources with the shortest period are selected from the uplink resources for transmitting the beam report and the uplink resources for transmitting the CSI report to transmit the first beam failure recovery request.

In a tenth implementation mode, the uplink resources whose signaling bit lengths are closest to the signaling bit length of the first beam failure recovery request are selected from the uplink resources for transmitting the beam report to transmit the first beam failure recovery request.

In an eleventh implementation mode, the uplink resources whose signaling bit lengths are closest to the signaling bit length of the first beam failure recovery request are selected from the uplink resources for transmitting the CSI report to transmit the first beam failure recovery request.

In a twelfth implementation mode, the uplink resources whose signaling bit lengths are closest to the signaling bit length of the first beam failure recovery request are selected from the uplink resources for transmitting the beam report and the uplink resources for transmitting the CSI report to transmit the first beam failure recovery request.

In a thirteenth implementation mode, the uplink resources whose indices meet the preset condition are selected from the uplink resources for transmitting the beam report to transmit the first beam failure recovery request. Optionally, the uplink resources whose indices meet the preset condition may include: uplink resources with minimum indices, uplink resources with maximum indices, or uplink resources with predetermined indices.

In a fourteenth implementation mode, the uplink resources whose indices meet the preset condition are selected from the uplink resources for transmitting the CSI report to transmit the first beam failure recovery request.

In a fifteenth implementation mode, the uplink resources whose indices meet the preset condition are selected from the uplink resources for transmitting the beam report and the uplink resources for transmitting the CSI report to transmit the first beam failure recovery request.

In a second circumstance, the uplink resources for transmitting the beam report and the uplink resources for transmitting the CSI report include a plurality of groups of uplink resources, and the uplink resources for transmitting the beam report are the same as the uplink resources for transmitting the CSI report. At this time, the uplink resources for transmitting the first beam failure recovery request may only be selected from the uplink resources for transmitting the beam report and the uplink resources for transmitting the CSI report in accordance with the first preset rule. Hence, the above-mentioned third, sixth, ninth, twelfth and fifteenth implementation modes may be adopted at this time.

It should be appreciated that, when the uplink resources for transmitting the beam report and the uplink resources for transmitting the CSI report have only one group of uplink resources, the uplink resources for transmitting the first beam failure recovery request acquired in the foregoing fifteen implementation modes are identical, namely, the only one group of uplink resources for transmitting the beam report and for transmitting the CSI report. Hence, in case that there is only one group of uplink resources for transmitting the beam report and for transmitting the CSI report, this group of uplink resources may be directly used to transmit the first beam failure recovery request.

S13: transmitting, by the UE, a second beam failure recovery request to the base station.

Information carried in the second beam failure recovery request is described hereinafter.

Optionally, the second beam failure recovery request may include an identifier of the candidate beam determined by the UE.

To be specific, the UE may measure the reference signal for candidate beam identification to acquire a measurement result and then determine the candidate beam in accordance with the measurement result. The reference signal for candidate beam identification is issued on a downlink beam other than the PDCCH beam originally configured for the UE, so the candidate beam definitely does not include the PDCCH beam originally configured for the UE.

Optionally, the second beam failure recovery request may include the identifier of the candidate beam determined by the UE and quality information about the candidate beam.

In other words, the UE may determine the candidate beam through measuring the reference signal for the candidate beam identification, and then add the identifier of the determined candidate beam and the quality information about the candidate beam into the second beam failure recovery request.

Optionally, the second beam failure recovery request may further include indication information for indicating a message type of a report message. The indication information may be a signaling bit newly added in the UCI, or an unused state of a signaling bit in the UCI. In other words, the second beam failure recovery request may further carry the indication information for indicating the message type of the second beam failure recovery request.

Uplink resources used in the transmission of the second beam failure recovery request are described hereinafter.

Similarly, in some embodiments of the present disclosure, the uplink resources for transmitting the second beam failure recovery request may be configured by the base station through an RRC signaling, i.e., the network side device may configure the uplink resources used by the UE to transmit the second beam failure recovery request.

Optionally, the second beam failure recovery request is transmitted on a second uplink resource different from a designated uplink resource. The designated uplink resource may include uplink resources for transmitting a beam report and uplink resources for transmitting a CSI report.

Optionally, in some embodiments of the present disclosure, the first uplink resource for transmitting the first beam failure recovery request, the second uplink resource for transmitting the second beam failure recovery request and the designated uplink resource are different from each other.

Because both the first uplink resource used by the UE to transmit the first beam failure recovery request and the second uplink resource used by the UE to transmit the second beam failure recovery request are different from the uplink resources for transmitting the beam report during beam management and different from the uplink resources for transmitting the CSI report, upon the receipt of the report message, the base station may determine a type of the received report message in accordance with the uplink resource on which the report message is received.

Optionally, the UE transmits the second beam failure recovery request to the base station through at least one of a physical uplink control channel (PUCCH) and a physical random access channel (PRACH) in accordance with a second preset rule. In other words, the UE may select the PUCCH and/or PRACH in accordance with the second preset rule to transmit the second beam failure recovery request to the base station.

Optionally, the second preset rule may include: if the quantity of signaling bits of the second beam failure recovery request is greater than a first threshold, transmitting the second beam failure recovery request to the base station through the PUCCH, and if the quantity of signaling bits of the second beam failure recovery request is less than or equal to the first threshold, transmitting the second beam failure recovery request to the base station through the PRACH.

To be specific, after the generation of the second beam failure recovery request, the UE may determine the quantity of the signaling bits of the second beam failure recovery request. The UE transmits the second beam failure recovery request to the base station through the PUCCH if the quantity of signaling bits of the second beam failure recovery request is greater than the first threshold, and transmits the second beam failure recovery request to the base station through the PRACH if the quantity of signaling bits of the second beam failure recovery request is less than or equal to the first threshold.

Optionally, the second preset rule may include: transmitting the second beam failure recovery request to the base station through a PUCCH if the PUCCH is available currently; and transmitting the second beam failure recovery request to the base station through the PRACH if the PUCCH is unavailable currently. In other words, the transmission of the second beam failure recovery request to the base station through the PUCCH may have a priority higher than the transmission of the second beam failure recovery request to the base station through the PRACH. When the PUCCH is available, the second beam failure recovery request is transmitted through the PUCCH, and when the PUCCH is unavailable, e.g., has been occupied, the second beam failure recovery request is transmitted through the PRACH.

Optionally, the second preset rule may include: transmitting the second beam failure recovery request to the base station through the PUCCH and the PRACH. In other words, the second beam failure recovery request may be transmitted to the base station through both the PUCCH and the PRACH.

Optionally, the UE may select at least one group of uplink resources from the uplink resources for transmitting the beam report and the uplink resources for transmitting the CSI report in accordance with a first preset rule to transmit the second beam failure recovery request to the base station.

Optionally, the first preset rule may include: selecting all uplink resources for transmitting the beam report and/or all uplink resources for transmitting the CSI report; or selecting closest available uplink resources from the uplink resources for transmitting the beam report and/or the uplink resources for transmitting the CSI report; or selecting uplink resources with a shortest period from the uplink resources for transmitting the beam report and/or the uplink resources for transmitting the CSI report; or selecting uplink resources whose signaling bit lengths are closest to a signaling bit length of the beam failure recovery request from the uplink resources for transmitting the beam report and/or the uplink resources for transmitting the CSI report; or selecting uplink resources whose indices meet a preset condition from the uplink resources for transmitting the beam report and/or the uplink resources for transmitting the CSI report.

For implementation modes of selecting at least one group of uplink resources from the uplink resources for transmitting the beam report and the uplink resources for transmitting the CSI report in accordance with the first preset rule to transmit the second beam failure recovery request to the base station, references may be made to the above-mentioned implementation modes of selecting at least one group of uplink resources from the uplink resources for transmitting the beam report and the uplink resources for transmitting the CSI report in accordance with the first preset rule to transmit the first beam failure recovery request to the base station, and thus a repeated description thereof is omitted.

According to the beam failure recovery request transmission method in some embodiments of the present disclosure, the UE may at first detect whether each of all PDCCH beams fails, transmit the first beam failure recovery request to the base station if the UE determines that the quantity of the PDCCH beams that fail is within the preset range, and transmit the second beam failure recovery request to the base station if the UE determines that all PDCCH beams fail. The preset range is greater than 0 and less than the total quantity of all PDCCH beams, so the quantity of the PDCCH beams that fail falling within the preset range means that parts of all PDCCH beams fail. The first beam failure recovery request transmitted by the UE to the base station when the quantity of the PDCCH beams that fail is within the preset range is different from the second beam failure recovery request transmitted by the UE to the base station when all PDCCH beams fail, so the base station may learn from the beam failure recovery request that the quantity of the PDCCH beams that fail is within the preset range, and then perform the beam failure recovery. As a result, according to some embodiments of the present disclosure, the beam failure recovery may be performed in time when parts of all PDCCH beams fail.

Second Embodiment

Figure 3:
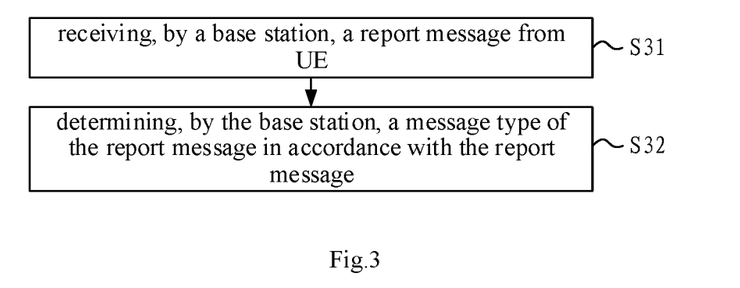
FIG. 3 is a flow chart of a beam failure recovery request reception method according to some embodiments of the present disclosure.

As shown in FIG. 3, the present disclosure provides in some embodiments a beam failure recovery request reception method, which includes the following steps S31 and S32.

S31. receiving, by a base station, a report message from UE.

S32. determining, by the base station, a message type of the report message in accordance with the report message.

The message type includes: a first beam failure recovery request transmitted by the UE to the base station when the quantity of PDCCH beams that fail is within a preset range and a second beam failure recovery request transmitted by the UE to the base station when all PDCCH beams fail. The preset range is greater than 0 and less than the total quantity of all PDCCH beams, and the first beam failure recovery request is different from the second beam failure recovery request.

According to the beam failure recovery request reception method in some embodiments of the present disclosure, the base station may receive and parse the report message from the UE. The first beam failure recovery request transmitted by the UE to the base station when the quantity of the PDCCH beams that fail is within the preset range is different from the second beam failure recovery request transmitted by the UE to the base station when all the PDCCH beams fail, so the base station may determine, in accordance with the report message, whether the quantity of the PDCCH beams that fail is within the preset range or all the PDCCH beams fail, and then perform processing according to different event types. As a result, in some embodiments of the present disclosure, the beam failure recovery may be performed in time when parts of all PDCCH beams fail.

Optionally, the base station may determine the message type of the report message through the following three schemes.

In a first scheme, the uplink resources used by the first beam failure recovery request, the second beam failure recovery request and a designated report message are different from each other, and the base station determines the message type in accordance with the uplink resource on which the report message is received. The designated report message may include a beam report and a CSI report.

For example, the UE may transmit the first beam failure recovery request using an uplink resource A, transmit the second beam failure recovery request using an uplink resource B and transmit the designated report message using an uplink resource C. If the uplink resource on which the report message is received is the uplink resource A, the base station may determine the message type as the first beam failure recovery request; if the uplink resource on which the report message is received is the uplink resource B, the base station may determine the message type as the second beam failure recovery message; and if the uplink resource on which the report message is received is the uplink resource C, the base station may determine the message type as the designated report message.

In a second scheme, message formats of the first beam failure recovery request, the second beam failure recovery request and the designated report message are different from each other, and the base station determines the message type in accordance with the message format of the report message. The designated report message may include a beam report and a CSI report.

For example, the UE may transmit the first beam failure recovery request in a format A, transmit the second beam failure recovery request in a format B and transmit the designated report message in a format C. If the format of the received report message is the format A, the base station may determine the message type as the first beam failure recovery request; if the format of the received report message is the format B, the base station may determine the message type as the second beam failure recovery message; and if the format of the received report message is the format C, the base station may determine the message type as the designated report message.

In a third scheme, both the first beam failure recovery request and the second beam failure recovery request include indication information, and the base station determines the message type in accordance with the indication information in the report message. The indication information is used to indicate the message type of the report message. The indication information may include a signaling bit newly added in UCI or an unused state of a signaling bit in the UCI. The indication information in the first beam failure recovery request is different from the indication information in the second beam failure recovery request.

Third Embodiment

Figure 4:
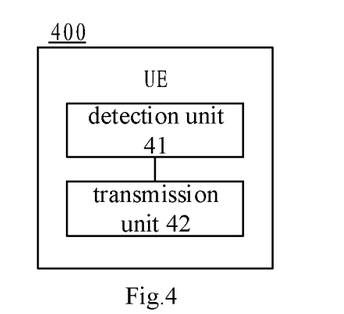
FIG. 4 is a schematic structural view of UE according to some embodiments of the present disclosure.

As shown in FIG. 4, the present disclosure provides in some embodiments UE 400, which includes a detection unit 41 and a transmission unit 42. The detection unit 41 is configured to detect whether each of all PDCCH beams fails, and the all PDCCH beams are PDCCH beams configured by a base station for the UE to monitor. The transmission unit 42 is configured to, when the detection unit determines that the quantity of the PDCCH beams that fail is within a preset range, transmit a first beam failure recovery request to the base station. The preset range is greater than 0 and less than the total quantity of all PDCCH beams. The transmission unit 42 is further configured to, when the detection unit determines that all the PDCCH beams fail, transmit a second beam failure recovery request to the base station. The second beam failure recovery request is different from the first beam failure recovery request.

Optionally, the detection unit 41 is specifically configured to detect a reference signal of each of all PDCCH beams, and determine whether each PDCCH beam fails. The reference signal may be a beam failure detection reference signal, a reference signal for beam measurement in beam management, or a reference signal for CSI measurement.

Optionally, the first beam failure recovery request is transmitted on a first uplink resource, the second beam failure recovery request is transmitted on a second uplink resource. The first uplink resource, the second uplink resource and a designated uplink resource are different from each other, and the designated uplink resource may include uplink resources for transmitting a beam report and uplink resources for transmitting a CSI report.

Optionally, the transmission unit 42 is specifically configured to select at least one group of uplink resources from the uplink resources for transmitting the beam report and the uplink resources for transmitting the CSI report in accordance with a first preset rule to transmit a beam failure recovery request to the base station. The beam failure recovery request is the first beam failure recovery request or the second beam failure recovery request.

Optionally, the first preset rule includes: selecting all uplink resources for transmitting the beam report and/or all uplink resources for transmitting the CSI report; or selecting closest available uplink resources from the uplink resources for transmitting the beam report and/or the uplink resources for transmitting the CSI report; or selecting uplink resources with a shortest period from the uplink resources for transmitting the beam report and/or the uplink resources for transmitting the CSI report; or selecting uplink resources whose signaling bit lengths are closest to a signaling bit length of the beam failure recovery request from the uplink resources for transmitting the beam report and/or the uplink resources for transmitting the CSI report; or selecting uplink resources whose indices meet a preset condition from the uplink resources for transmitting the beam report and/or the uplink resources for transmitting the CSI report.

Optionally, the transmission unit 42 is specifically configured to transmit the second beam failure recovery request to the base station through at least one of a PUCCH and a PRACH in accordance with a second preset rule.

Optionally, the second preset rule may include: if the quantity of signaling bits of the second beam failure recovery request is greater than a first threshold, transmitting the second beam failure recovery request to the base station through the PUCCH, and if the quantity of signaling bits of the second beam failure recovery request is less than or equal to the first threshold, transmitting the second beam failure recovery request to the base station through the PRACH; or if it is determined that a PUCCH is available currently, transmitting the second beam failure recovery request to the base station through the PUCCH, and if it is determined that the PUCCH is unavailable currently, transmitting the second beam failure recovery request to the base station through the PRACH; or transmitting the second beam failure recovery request to the base station through the PUCCH and the PRACH.

Optionally, the first beam failure recovery request includes at least one of: identifiers of one or more PDCCH beams that fail, quality information about the one or more PDCCH beams that fail, identifiers of the one or more downlink beams whose qualities meet a preset condition, or quality information about the one or more downlink beams whose qualities meet the preset condition.

Optionally, the quantity of the downlink beams whose qualities meet the preset condition is configured by the base station for the UE.

Optionally, the detection unit 41 is further configured to determine the downlink beam whose quality meets the preset condition through measuring the beam failure detection reference signal, the reference signal for beam measurement in beam management, or a reference signal for candidate beam identification.

Optionally, the second beam failure recovery request may include an identifier of the candidate beam determined by the UE, or include the identifier of the candidate beam determined by the UE and quality information about the candidate beam.

Optionally, both the first beam failure recovery request and the second beam failure recovery request include indication information for indicating the message type of the report message. The indication information is a signaling bit newly added in UCI or an unused state of a signaling bit in the UCI, and the indication information in the first beam failure recovery request is different from the indication information in the second beam failure recovery request.

According to some embodiments of the present disclosure, the UE may transmit the first beam failure recovery request to the base station when the quantity of the PDCCH beams that fail is within the preset range, and the first beam failure recovery request is different from the second beam failure recovery request transmitted when all the PDCCH beams fail, so the base station may learn from the first beam failure recovery request that the quantity of the PDCCH beams that fail is within the preset range, and then perform the beam failure recovery. As a result, in some embodiments of the present disclosure, the beam failure recovery may be performed in time when parts of all PDCCH beams fail.

Fourth Embodiment

Figure 5:
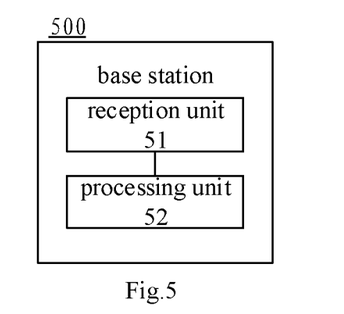
FIG. 5 is a schematic structural view of a base station according to some embodiments of the present disclosure.

As shown in FIG. 5, the present disclosure provides in some embodiments a base station 500 which includes a reception unit 51 and a processing unit 52. The reception unit 51 is configured to receive a report message from UE. The processing unit 52 is configured to determine a message type of the report message in accordance with the report message. The message type includes: a first beam failure recovery request transmitted by the UE to the base station when the quantity of PDCCH beams that fail is within a preset range and a second beam failure recovery request transmitted by the UE to the base station when all PDCCH beams fail. The preset range is greater than 0 and less than the total quantity of the PDCCH beams.

Optionally, uplink resources used by the first beam failure recovery request, the second beam failure recovery request and a designated report message are different from each other. The processing unit 52 is specifically configured to determine the message type in accordance with the uplink resource on which the report message is received, and the designated report message may include at least one of a beam report and a CSI report.

Optionally, message formats of the first beam failure recovery request, the second beam failure recovery request and a designated report message are different from each other. The processing unit 52 is specifically configured to determine the message type in accordance with the message format of the report message, and the designated report message may include at least one of a beam report and a CSI report.

Optionally, both the first beam failure recovery request and the second beam failure recovery request include indication information. The processing unit 52 is specifically configured to determine the message type in accordance with the indication information in the report message. The indication information is used to indicate the message type of the report message, and includes a signaling bit newly added in UCI or an unused state of a signaling bit in the UCI.

The UE in some embodiments of the present disclosure is capable of implementing the above-mentioned process in the first embodiment, and a repeated description thereof is omitted herein to avoid redundancy.

The base station may receive and parse the report message from the UE. The first beam failure recovery request transmitted by the UE to the base station when the quantity of the PDCCH beams that fail is within the preset range is different from the second beam failure recovery request transmitted by the UE to the base station when all the PDCCH beams fail, so the base station may determine, in accordance with the report message, whether the quantity of the PDCCH beams that fail is within the preset range or all the PDCCH beams fail, and then perform processing according to different event types. As a result, in some embodiments of the present disclosure, the beam failure recovery may be performed in time when parts of all PDCCH beams fail.

Fifth Embodiment

Figure 6:
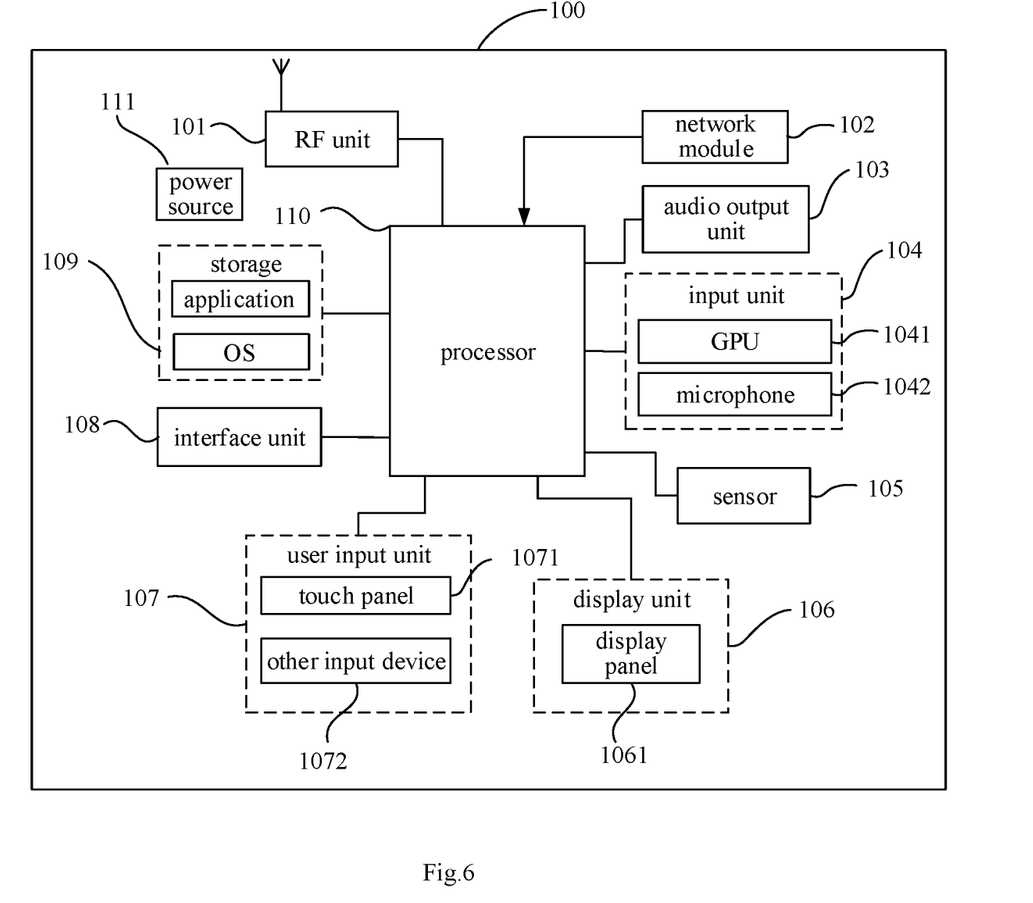
FIG. 6 is another schematic structural view of UE according to some embodiments of the present disclosure.

FIG. 6 is a schematic hardware structural view of UE implementing some embodiments of the present disclosure. UE 100 includes, but is not limited to: a radio frequency (RF) unit 101, a network module 102, an audio output unit 103, an input unit 104, a sensor 105, a display unit 106, a user input unit 107, an interface unit 108, a storage 109, a processor 110, a power source 111, etc. It should be appreciated that, the structure of UE as shown in FIG. 6 does not constitute a limitation on the UE. The UE may include more or fewer components, or some components may be combined, or the UE may have different component layouts. In some embodiments of the present disclosure, the UE may include, but is not limited to: a mobile phone, tablet, notebook computer, palm computer, vehicle-mounted terminal, wearable device, pedometer or the like.

The processor 110 is configured to detect whether each of all PDCCH beams fails, and the all PDCCH beams are PDCCH beams configured by a base station for UE to monitor.

The RF unit 101 is configured to: when the processor 110 determines that the quantity of the PDCCH beams that fail is within a preset range, transmit a first beam failure recovery request to the base station, where the preset range is greater than 0 and less than the total quantity of the PDCCH beams; and when the processor 110 determines that all the PDCCH beams fail, transmit a second beam failure recovery request to the base station. The second beam failure recovery request is different from the first beam failure recovery request.

The UE may transmit the first beam failure recovery request to the base station when the quantity of the PDCCH beams that fail is within the preset range, and the first beam failure recovery request is different from the second beam failure recovery request transmitted when all the PDCCH beams fail, so the base station may learn from the first beam failure recovery request that the quantity of the PDCCH beams that fail is within the preset range, and then perform the beam failure recovery. As a result, in some embodiments of the present disclosure, the beam failure recovery may be performed in time when parts of all PDCCH beams fail.

It should be appreciated that, in some embodiments of the present disclosure, the RF unit 101 may be configured to transmit and receive signals during information transmission or phone call. To be specific, the RF unit 101 may, upon receiving downlink data from the base station, transmit the downlink data to the processor 110 for processing. In addition, the RF unit 101 may transmit uplink data to the base station. Usually, the RF unit 101 includes, but is not limited to: an antenna, at least one amplifier, a transceiver, a coupler, a low-noise amplifier, a duplexer and the like. In addition, the RF unit 101 may communicate with a network and other devices via a wireless communication system.

The UE provides a user with wireless broadband Internet access by means of the network module 102, such as sending and receiving emails, browsing webpages and accessing streamed media.

The audio output unit 103 is configured to convert audio data received by the RF unit 101 or the network module 102 or audio data stored in the storage 109 into an audio signal and output the audio signal as a sound. In addition, the audio output unit 103 is further configured to provide an audio output related to a specific function executed by the UE 100 (such as, incoming call ringtone, message received ringtone). The audio output unit 103 includes a loudspeaker, a buzzer and a telephone receiver.

The input unit 104 is configured to receive an audio or video signal. The input unit 104 may include a graphics processing unit (GPU) 1041 and a microphone 1042. The GPU 1041 is configured to process image data of a static image or video captured by an image capturing unit (e.g., a camera) in a video capturing mode or an image capturing mode, and a processed image frame may be displayed by the display unit 106. The image frame processed by the GPU 1041 may be stored in the storage 109 (or other storage medium) or transmitted via the RF unit 101 or network module 102. The microphone 1042 is configured to receive a sound, and convert the sound into audio data. In a phone call mode, the processed audio data may be converted into a format suitable for transmission to a mobile communication base station via the RF unit 101 and output.

The UE 100 further includes at least one sensor 105, for example, an optical sensor, a motion sensor, among others. In specific, the optical sensor includes ambient light sensor and proximity sensor. The ambient light sensor may adjust a brightness of a display panel 1061 according to the ambient light conditions. The proximity sensor may deactivate the display panel 1061 and/or a backlight when the UE 100 is moved close to an ear. As a kind of motion sensor, an acceleration sensor may detect a magnitude of acceleration on each direction (generally, on three axes). While remaining still, the acceleration sensor may detect the magnitude and direction of gravity, which may be used in posture identification of the UE (e.g., switch between portrait and landscape modes, related games, magnetometer posture calibration), vibration identification related function (e.g., pedometer, tapping) and the like; the sensor 105 may further include a fingerprint sensor, a pressure sensor, an iris sensor, a molecule sensor, a gyroscope, a barometer, a hygrometer, a thermometer, an infrared sensor and the like, which is not described in detail herein.

The display unit 106 is configured to display information inputted by the user or provided to the user. The display unit 106 may include the display panel 1061. The display panel 1061 may be constructed in form of liquid crystal display (LCD), organic light-emitting diode (OLED) and the like.

The user input unit 107 may be configured to receive input numerical information or character information, and generate key signal inputs related to the user setting and function control of the UE. To be specific, the user input unit 107 includes a touch panel 1071 and other input device 1072. The touch panel 1071, also known as touch screen, may detect the touches thereon or in the vicinity thereof performed by the user (such as touch operations performed on or in the vicinity of the touch panel 1071 by the user using a finger, stylus or any other suitable object or accessory). The touch panel 1071 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 110, as well as receives and executes the commands from the processor 110. Further, the touch panel 1071 may be implemented in a variety of modes, such as resistance, capacitance, infrared and surface acoustic wave. In addition to the touch panel 1071, the user input unit 107 may include other input devices 1072. In specific, the other input devices 1072 may include, but is not limited to: physical keyboard, functional keys (such as volume control button, switch button, etc.), track ball, mouse, joystick, which is not described in detail herein.

Further, the touch panel 1071 may overlie the display panel 1061. Having detected a touch operation thereon or in the vicinity thereof, the touch panel 1071 conveys the detected touch signal to the processor 110 to determine a category of the touch event, and the processor 110 provides corresponding visual output on the display panel 1061 in accordance with the category of the touch event. Although, in FIG. 6, the touch panel 1071 and the display panel 1061 are provided as two separate parts to implement the input and output functions of the UE, the touch panel 1071 and the display panel 1061 may be integrated to implement the input and output functions of the UE in some embodiments, which is not limited herein.

The interface unit 108 is an interface by which an external device is connected to the UE 100. For example, the external device may include a wired or wireless headset port, an external power source (or battery charger) port, a wired or wireless data port, a storage card port, a port configured to be connected to a device having an identification module, an audio input/output (I/O) port, a video I/O port, an earphone port and the like. The interface unit 108 may be configured to receive input (e.g., data information, power, etc.) from the external device and transfer the received input to one or more components in the UE 100, or may be configured to transmit data between the UE 100 and the external device.

The storage 109 may be configured to store software program and other data. The storage 109 may include generally a program storage area and a data storage area. The program storage area may store an operating system (OS), an application required for at least one function (such as an audio playing function and an image playback function) and the like; the data storage area may store data (e.g., audio data, phone book, etc.) created according to usage of a mobile phone, and the like. Moreover, the storage 109 may include a cache, as well as a non-volatile storage, such as at least one disk storage device, flash memory or other non-volatile solid-state storage devices.

The processor 110 is a control center of the UE. The processor 110 is connected to various parts of the entire UE through various interfaces and lines, and performs various functions of the UE and processes data by executing or running software programs and/or modules stored in the storage 109 and invoking data stored in the storage 109, so as to achieve an overall monitoring of the UE. The processor 110 may include one or more processing units; optionally, the processor 110 may integrate an application processor and a modem, wherein the application processor is mainly responsible for executing an operating system, a user interface, an application program, etc., while the modem is mainly responsible for handling wireless communication. It is understood, the modem may not be integrated in the processor 110.

The UE 100 may further include a power source 111 (e.g., a battery) providing power to various components. Optionally, the power source 111 may be logically connected to the processor 1110 via a power management system, such that functions such as charging management, discharging management and power management may be achieved through the power management system.

In addition, the UE 100 may include some functional modules not shown, which are not described in detail herein.

Sixth Embodiment

Figure 7:
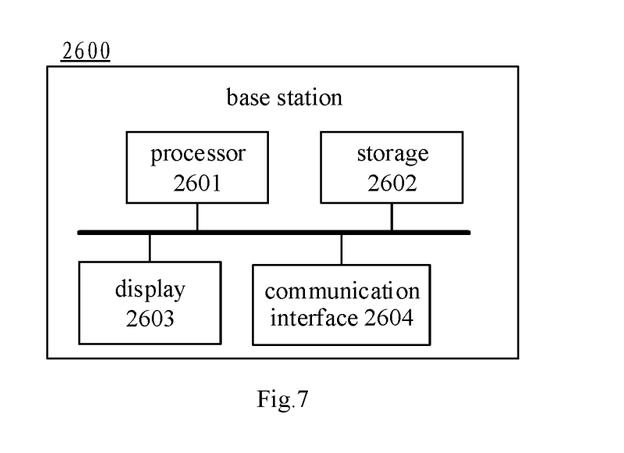
FIG. 7 is another schematic structural view of a base station according to some embodiments of the present disclosure.

FIG. 7 is a schematic hardware structural view of a base station implementing some embodiments of the present disclosure. The base station 2600 includes a processor 2601, a transceiver 2602, a storage 2603, a user interface 2604 and a bus interface.

The transceiver 2602 is configured to receive a report message from UE. The processor 2601 is configured to determine a message type of the report message in accordance with the report message. The message type includes a first beam failure recovery request transmitted by the UE to the base station when the quantity of PDCCH beams that fail is within a preset range and a second beam failure recovery request transmitted by the UE to the base station when all PDCCH beams fail. The preset range is greater than 0 and less than the total quantity of the PDCCH beams.

The base station may receive and parse the report message from the UE. The first beam failure recovery request transmitted by the UE to the base station when the quantity of the PDCCH beams that fail is within the preset range is different from the second beam failure recovery request transmitted by the UE to the base station when all the PDCCH beams fail, so the base station may determine, in accordance with the report message, whether the quantity of the PDCCH beams that fail is within the preset range or all the PDCCH beams fail, and then perform processing according to different event types. As a result, in some embodiments of the present disclosure, the beam failure recovery may be performed in time when parts of all PDCCH beams fail.

In FIG. 7, a bus architecture may include any number of interconnected buses and bridges, and various circuits including one or more processors represented by the processor 2601 and a storage represented by the storage 2603 are linked together. The bus architecture may also connect various other circuits such as peripherals, voltage regulators and power management circuits, which is well known in the art. Therefore, a detailed description thereof is omitted herein. A bus interface provides an interface. The transceiver 2602 may include multiple elements, such as a receiver and a transmitter, to allow for communication with various other apparatuses on a transmission medium. For different UE, the user interface 2604 may be an interface capable of externally/internally connecting desired devices, including, but not limited to, a keypad, a display, a speaker, a microphone, and a joystick. The processor 2601 is responsible for managing the bus architecture and general processing. The storage 2603 can store data used by the processor 2601 while performing operations.

In addition, the base station 2600 may include some functional modules not shown, which are not described in detail herein.

Seventh Embodiment

Optionally, the present disclosure further provides in some embodiments UE 100 which includes a processor 110, a storage 109, and a computer program stored in the storage 109 and configured to be executed by the processor 110. The processor 110 is configured to execute the computer program to implement various processes of the beam failure recovery request transmission method in the first embodiment and achieve a same technical effect, and a repeated description thereof is omitted herein to avoid redundancy.

Optionally, the present disclosure further provides in some embodiments a base station which includes a processor 2601, a storage 2603, and a computer program stored in the storage 2603 and configured to be executed by the processor 2601. The processor 2601 is configured to execute the computer program to implement various processes of the beam failure recovery request reception method in the second embodiment and achieve a same technical effect, and a repeated description thereof is omitted herein to avoid redundancy.

The present disclosure further provides in some embodiments a computer-readable storage medium storing therein a computer program. The computer program is configured to be executed by a processor to implement various processes of the beam failure recovery request transmission method in the first embodiment and achieve a same technical effect, and a repeated description thereof is omitted herein to avoid redundancy. The computer-readable storage medium may be a read-only memory (ROM), a random access memory (RAM), a magnetic disk or an optical disc.

The present disclosure further provides in some embodiments a computer-readable storage medium storing therein a computer program. The computer program is configured to be executed by a processor to implement the beam failure recovery request reception method in the second embodiment and achieve a same technical effect, and a repeated description thereof is omitted herein to avoid redundancy. The computer-readable storage medium may be an ROM, an RAM, a magnetic disk or an optical disc.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk or an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A beam failure recovery request transmission method, comprising:
    detecting, by user equipment (UE), whether each physical downlink control channel (PDCCH) beam of all PDCCH beams fails, wherein the all PDCCH beams are PDCCH beams configured by a base station for the UE to monitor;
    if the UE determines that a quantity of PDCCH beams that fail is within a preset range, transmitting, by the UE, a first beam failure recovery request to the base station, wherein the preset range is greater than 0 and less than a total quantity of the all PDCCH beams;
    if the UE determines that the all PDCCH beams fail, transmitting, by the UE, a second beam failure recovery request to the base station,
    wherein the second beam failure recovery request is different from the first beam failure recovery request,
    wherein both the first beam failure recovery request and the second beam failure recovery request comprise indication information for indicating a message type of a report message, the indication information comprises a signaling bit added in uplink control information (UCI) or an unused state of a signaling bit in the UCI; and the indication information in the first beam failure recovery request in different from the indication information in the second beam failure recovery request.

2. The beam failure recovery request transmission method according to claim 1, wherein a reference signal of the each PDCCH beam is detected by the UE to determine whether the each PDCCH beam fails, and the reference signal is a beam failure detection reference signal, a reference signal for beam measurement in beam management, or a reference signal for channel state information (CSI) measurement.

3. The beam failure recovery request transmission method according to claim 1, wherein the first beam failure recovery request is transmitted on a first uplink resource, the second beam failure recovery request is transmitted on a second uplink resource,
    the first uplink resource, the second uplink resource and a designated uplink resource are different from each other, and the designated uplink resource comprises uplink resources for transmitting a beam report and uplink resources for transmitting a CSI report.

4. The beam failure recovery request transmission method according to claim 1, wherein at least one group of uplink resources is selected by the UE from the uplink resources for transmitting the beam report and the uplink resources for transmitting the CSI report in accordance with a first preset rule to transmit a beam failure recovery request to the base station, and the beam failure recovery request is the first beam failure recovery request or the second beam failure recovery request.

5. The beam failure recovery request transmission method according to claim 4, wherein the first preset rule comprises:
    selecting all the uplink resources for transmitting the beam report and/or all the uplink resources for transmitting the CSI report; or,
    selecting closest available uplink resources from the uplink resources for transmitting the beam report and/or the uplink resources for transmitting the CSI report; or,
    selecting uplink resources with a shortest period from the uplink resources for transmitting the beam report and/or the uplink resources for transmitting the CSI report; or,
    selecting uplink resources whose signaling bit lengths are closest to a signaling bit length of the beam failure recovery request from the uplink resources for transmitting the beam report and/or the uplink resources for transmitting the CSI report; or,
    selecting uplink resources whose indices meet a preset condition from the uplink resources for transmitting the beam report and/or the uplink resources for transmitting the CSI report.

6. The beam failure recovery request transmission method according to claim 1, wherein the second beam failure recovery request is transmitted by the UE to the base station through at least one of a physical uplink control channel (PUCCH) and a physical random access channel (PRACH) in accordance with a second preset rule.

7. The beam failure recovery request transmission method according to claim 6, wherein the second preset rule comprises:
    if a quantity of signaling bits of the second beam failure recovery request is greater than a first threshold, transmitting the second beam failure recovery request to the base station through the PUCCH, if the quantity of signaling bits of the second beam failure recovery request is less than or equal to the first threshold, transmitting the second beam failure recovery request to the base station through the PRACH; or,
    if it is determined that the PUCCH is available currently, transmitting the second beam failure recovery request to the base station through the PUCCH, if it is determined that the PUCCH is unavailable currently, transmitting the second beam failure recovery request to the base station through the PRACH; or, transmitting the second beam failure recovery request to the base station through the PUCCH and the PRACH.

8. The beam failure recovery request transmission method according to claim 1, wherein the first beam failure recovery request comprises at least one of: identifiers of one or more PDCCH beams that fail, quality information about the one or more PDCCH beams that fail, identifiers of one or more downlink beams whose qualities meet a preset condition, or quality information about the one or more downlink beams whose qualities meet the preset condition.

9. The beam failure recovery request transmission method according to claim 8, wherein a quantity of the downlink beams whose qualities meet the preset condition is configured by the base station for the UE.

10. The beam failure recovery request transmission method according to claim 8, wherein the downlink beam whose quality meets the preset condition is determined by the UE through measuring a beam failure detection reference signal, a reference signal for beam measurement in beam management, or a reference signal for candidate beam identification.

11. The beam failure recovery request transmission method according to claim 1, wherein the second beam failure recovery request comprises:
an identifier of a candidate beam determined by the UE; or,
the identifier of the candidate beam determined by the UE and quality information about the candidate beam.

12. A beam failure recovery request reception method, comprising:
receiving, by a base station, a report message from user equipment (UE);
determining, by the base station, a message type of the report message in accordance with the report message, wherein the message type of the report message comprises a first beam failure recovery request transmitted by the UE to the base station when a quantity of physical downlink control channel (PDCCH) beams that fail is within a preset range and a second beam failure recovery request transmitted by the UE to the base station when all PDCCH beams fail, the preset range is greater than 0 and less than a total quantity of the all PDCCH beams, and the first beam failure recovery request is different from the second beam failure recovery request;
wherein both the first beam failure recovery request and the second beam failure recovery request comprise indication information, the message type of the report message is determined by the base station in accordance with the indication information in the report message;
the indication information is used to indicate the message type of the report message, the indication information comprises a signaling bit added in uplink control information (UCI) or an unused state of signaling bit in the UCI, and the indication information in the first beam failure recovery request is different from the indication information in the second beam failure recovery request.

13. The beam failure recovery request reception method according to claim 12, wherein uplink resources used by the first beam failure recovery request, the second beam failure recovery request and a designated report message are different from each other, the message type of the report message is determined by the base station in accordance with an uplink resource on which the report message is received, and the designated report message comprises a beam report and a channel state information (CSI) report.

14. The beam failure recovery request reception method according to claim 12, wherein message formats of the first beam failure recovery request, the second beam failure recovery request and a designated report message are different from each other, the message type of the report message is determined by the base station in accordance with the message format of the report message, and the designated report message comprises a beam report and a CSI report.

15. User equipment (UE), comprising a processor, a storage, and a computer program stored in the storage and configured to be executed by the processor, wherein the processor is configured to execute the computer program, to implement following steps:
detecting whether each physical downlink control channel (PDCCH) beam of all PDCCH beams fails, wherein the all PDCCH beams are PDCCH beams configured by a base station for the UE to monitor;
if it is determined that a quantity of PDCCH beams that fail is within a preset range, transmitting a first beam failure recovery request to the base station, wherein the preset range is greater than 0 and less than a total quantity of the all PDCCH beams;
if it is determined that the all PDCCH beams fail, transmitting a second beam failure recovery request to the base station,
wherein the second beam failure recovery request is different from the first beam failure recovery request;
wherein both the first beam recovery requestand the second beam failure recovery request comprise indication information for indicating a message type of a report message, the indication information comprises a signaling bit added in uplink control information (UCI) or an unused state of a signaling bit in the UCI; and the indication information in the first beam failure revoery request is different from the indication information in the second beam failure recovery request.

16. A base station, comprising a processor, a storage, and a computer program stored in the storage and configured to be executed by the processor, wherein the processor is configured to execute the computer program, to implement steps of the beam failure recovery request reception method according to claim 12.

17. A non-transitory computer-readable storage medium storing therein a computer program, wherein the computer program is configured to be executed by a processor, to implement steps of the beam failure recovery request transmission method according to claim 1.

18. A non-transitory computer-readable storage medium storing therein a computer program, wherein the computer program is configured to be executed by a processor, to implement steps of the beam failure recovery request reception method according to claim 12.

* * * * *